United States Patent
Schmitz

(10) Patent No.: US 11,378,010 B2
(45) Date of Patent: Jul. 5, 2022

(54) ADDITIVE MANUFACTURED DUCTED HEAT EXCHANGER SYSTEM

(71) Applicant: United Technologies Corporation, Farmington, CT (US)

(72) Inventor: John T. Schmitz, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 128 days.

(21) Appl. No.: 16/830,470

(22) Filed: Mar. 26, 2020

(65) Prior Publication Data

US 2020/0240328 A1     Jul. 30, 2020

Related U.S. Application Data

(62) Division of application No. 14/886,446, filed on Oct. 19, 2015, now Pat. No. 10,634,054.

(Continued)

(51) Int. Cl.
    *F02C 7/18*          (2006.01)
    *B23P 15/26*      (2006.01)
    (Continued)

(52) U.S. Cl.
    CPC ............... *F02C 7/18* (2013.01); *B23P 15/26* (2013.01); *F02C 7/14* (2013.01); *F28F 7/02* (2013.01);
    (Continued)

(58) Field of Classification Search
    CPC ..... F01P 11/10; F02C 7/14; F02C 7/18; F02C 7/10; F02K 1/822; F02K 3/115;
    (Continued)

(56) References Cited

U.S. PATENT DOCUMENTS 3,702,633 A * 11/1972 Csathy ...................... F28F 9/00
                                                                                       165/159
4,800,955 A * 1/1989 Hagemeister ............. F28D 7/06
                                                                                       165/163

(Continued)

FOREIGN PATENT DOCUMENTS

CA          2046797 A     2/1992
EP          0469827 A     2/1992
(Continued)

OTHER PUBLICATIONS

Japanese Office Action dated Sep. 6, 2016 issued for corresponding Japanese Patent Application 2015-205146.
(Continued)

*Primary Examiner* — Gerald L Sung
*Assistant Examiner* — Rene D Ford
(74) *Attorney, Agent, or Firm* — Bachman & LaPointe, P.C.

(57) ABSTRACT

A ducted heat exchanger system for a gas turbine engine includes an additive manufactured heat exchanger core with a contoured external and/or internal geometry. A method of additively manufacturing a heat exchanger for a gas turbine engine includes additively manufacturing a core of a heat exchanger to set a ratio of local surface area to flow area to control a pressure drop per unit length along the core.

8 Claims, 7 Drawing Sheets

Related U.S. Application Data

(60) Provisional application No. 62/066,445, filed on Oct. 21, 2014.

(51) Int. Cl.
| | | |
|---|---|---|
| *F02C 7/14* | (2006.01) | |
| *F28F 7/02* | (2006.01) | |
| *F02C 7/10* | (2006.01) | |
| *B22F 5/00* | (2006.01) | |
| *B33Y 80/00* | (2015.01) | |
| *F28F 13/08* | (2006.01) | |
| *F28D 21/00* | (2006.01) | |
| *F28D 1/02* | (2006.01) | |

(52) U.S. Cl.
CPC .............. *B22F 5/009* (2013.01); *B33Y 80/00* (2014.12); *F02C 7/10* (2013.01); *F05D 2230/31* (2013.01); *F28D 2001/0273* (2013.01); *F28D 2021/0021* (2013.01); *F28D 2021/0026* (2013.01); *F28F 13/08* (2013.01); *F28F 2255/00* (2013.01); *Y02T 50/60* (2013.01)

(58) Field of Classification Search
CPC .......... F28F 7/02; F28F 2255/00; F28F 13/08; F28F 2009/029; F28F 2250/02; B23P 15/26; F28D 2001/0273; F28D 2021/0021; F28D 2021/0026; F28D 1/05375; Y02T 50/60; B22F 5/009; B22F 10/20; B33Y 80/00; F05D 2230/31; F05D 2260/213; F05D 2260/221–22141; Y02P 10/25; F23R 2900/03045

See application file for complete search history.

(56) References Cited

U.S. PATENT DOCUMENTS

| | | |
|---|---|---|
| 5,123,242 A | 6/1992 | Miller |
| 5,203,163 A | 4/1993 | Parsons |
| 5,729,969 A | 3/1998 | Porte |
| 6,551,056 B2 | 4/2003 | Rau |
| 6,773,225 B2 | 8/2004 | Yuri et al. |
| 6,787,947 B2 | 9/2004 | Coulon et al. |
| 6,837,676 B2 | 1/2005 | Yuri et al. |
| 6,940,037 B1 | 9/2005 | Kovacevic et al. |
| 7,048,497 B2 | 5/2006 | Arilla et al. |
| 7,625,171 B2 | 12/2009 | Maguire et al. |
| 7,810,552 B2 | 10/2010 | Slaughter |
| 7,866,372 B2 | 1/2011 | Slaughter |
| 7,866,377 B2 | 1/2011 | Slaughter |
| 7,874,799 B2 | 1/2011 | Young et al. |
| 7,926,261 B2 | 4/2011 | Porte |
| 8,387,362 B2 | 3/2013 | Storage et al. |
| 8,408,868 B2 | 4/2013 | Hatman |
| 8,517,666 B2 | 8/2013 | Alvanos et al. |
| 8,763,363 B2 | 7/2014 | Ranganathan |
| 2004/0191106 A1 | 9/2004 | O'Neill et al. |
| 2004/0247429 A1 | 12/2004 | Arilla et al. |
| 2005/0221150 A1 | 10/2005 | Revol |
| 2006/0245987 A1 | 11/2006 | Schmidt |
| 2008/0053060 A1 | 3/2008 | Olver |
| 2009/0097972 A1 | 4/2009 | Murphy |
| 2012/0216506 A1 | 8/2012 | Eleftheriou et al. |
| 2012/0216543 A1 | 8/2012 | Eleftheriou et al. |
| 2012/0216544 A1 | 8/2012 | Eleftheriou et al. |
| 2013/0236299 A1 | 9/2013 | Kington et al. |
| 2014/0030074 A1 | 1/2014 | Roberge |
| 2014/0140829 A1 | 5/2014 | Blair et al. |
| 2016/0222886 A1 | 8/2016 | Riehle et al. |

FOREIGN PATENT DOCUMENTS

| | | |
|---|---|---|
| EP | 2636982 A2 | 9/2013 |
| GB | 2521913 A | 7/2015 |
| JP | H04234536 A | 8/1992 |
| JP | H0694816 B2 | 11/1994 |
| JP | H0694817 A | 11/1994 |
| JP | 2007-303470 A | 11/2007 |
| JP | 2008144752 A | 6/2008 |
| JP | 2009013982 A | 1/2009 |
| JP | 2009510304 A | 3/2009 |
| JP | 2014034975 A | 2/2014 |
| JP | 2014111930 A | 6/2014 |
| WO | 2008046386 A1 | 4/2008 |

OTHER PUBLICATIONS

Japanese Office Action dated Feb. 21, 2017 issued for corresponding Japanese Patent Application 2015-205146.
Chinese Office Action dated Aug. 2, 2018 issued for corresponding Chinese Patent Application 201510684286.4.
Chinese Office Action dated Apr. 30, 2019 issued for corresponding Chinese Patent Application 201510684286.4.
Chinese Office Action dated Oct. 29, 2019 issued for corresponding Chinese Patent Application 201510684286.4.

* cited by examiner

ADDITIVE MANUFACTURED DUCTED HEAT EXCHANGER SYSTEM

CROSS REFERENCE TO RELATED APPLICATIONS

This application is a divisional of U.S. patent application Ser. No. 14/886,446, filed Oct. 19, 2015 which claims the benefit of provisional application Ser. No. 62/066,445, filed Oct. 21, 2014.

BACKGROUND

The present disclosure relates to heat exchangers and, more particularly, to an additive manufactured heat exchanger for a gas turbine engine.

Gas turbine engines, such as those that power modern commercial and military aircraft, typically include a ducted heat exchanger system with a heat exchanger and associated equipment to exchange engine heat with an airflow. The gas turbine engine architecture typically dictates the ducted heat exchanger placement within a nacelle that encloses the engine.

Conventional heat exchanger cores, have uniform internal and external geometries due in part to the complexity of manufacture. Although effective, the heat exchanger may be subject to local stress concentrations or other structural requirements that drive increases in thickness or material changes for the entire heat exchanger. This results in increased weight and cost for the TMS. The heat exchanger is also typically constructed of dissimilar metals that expand at differing rates when exposed to varying thermal boundary conditions typical of a gas turbine engine environment that may further limit the life of the heat exchanger.

Ducted heat exchangers also utilize an inlet flow guide and an exit flow guide within the nacelle that is aerodynamically contoured to distribute the air onto the heat exchanger. Manufacturing techniques utilized for these surfaces may not always be conducive to an optimized aerodynamic geometry and may impact ideal nacelle aerodynamic design. This may result in an engine performance debit.

SUMMARY

A ducted heat exchanger system for a gas turbine engine according to one disclosed non-limiting embodiment of the present disclosure includes an additive manufactured heat exchanger core with a contoured external geometry.

A further embodiment of the present disclosure includes the ducted heat exchanger system, wherein a front face of the core is non-planar and the core is at least partially arcuate.

A further embodiment of any of the foregoing embodiments of the present disclosure includes the ducted heat exchanger system, wherein the front face of the core is contoured such that an airflow that enters the core is generally perpendicular to the front face over the entirety of the front face.

A further embodiment of any of the foregoing embodiments of the present disclosure includes the ducted heat exchanger system, wherein the front face of the core is contoured such that an airflow that enters the core is generally perpendicular to the front face.

A further embodiment of any of the foregoing embodiments of the present disclosure includes the ducted heat exchanger system, wherein the front face of the core extends into a diffusion area of a duct within which the core is located.

A further embodiment of any of the foregoing embodiments of the present disclosure includes the ducted heat exchanger system, wherein a rear face of the core is non-planar and the core is at least partially arcuate.

A further embodiment of any of the foregoing embodiments of the present disclosure includes the ducted heat exchanger system, wherein the rear face of the core is contoured such that an airflow that exits the core is generally perpendicular to the rear face over the entirety of the rear face.

A further embodiment of any of the foregoing embodiments of the present disclosure includes the ducted heat exchanger system, wherein the front face of the core is contoured such that an airflow that exits the core is generally perpendicular to the rear face.

A further embodiment of any of the foregoing embodiments of the present disclosure includes the ducted heat exchanger system, wherein the rear face of the core extends into a contraction area of a duct within which the core is located.

A further embodiment of any of the foregoing embodiments of the present disclosure includes the ducted heat exchanger system, wherein the core is at least partially arcuate for location within a nacelle of a gas turbine engine.

A further embodiment of any of the foregoing embodiments of the present disclosure includes the ducted heat exchanger system, wherein an internal geometry of the core is contoured such that at least one of a multiple of flow passages through the core is varied throughout a length of the flow passage.

A ducted heat exchanger system for a gas turbine engine according to another disclosed non-limiting embodiment of the present disclosure includes an additive manufactured heat exchanger core with a contoured internal geometry.

A further embodiment of any of the foregoing embodiments of the present disclosure includes the ducted heat exchanger system, wherein the core is at least partially arcuate for location within a nacelle of a gas turbine engine.

A further embodiment of any of the foregoing embodiments of the present disclosure includes the ducted heat exchanger system, wherein an internal geometry of the core is contoured such that at least one of a multiple of flow passages through the core is varied throughout a length of the flow passage.

A further embodiment of any of the foregoing embodiments of the present disclosure includes the ducted heat exchanger system, wherein a fin density of the internal geometry of the core is varied with respect to a distance along the length of the flow passage.

A further embodiment of any of the foregoing embodiments of the present disclosure includes the ducted heat exchanger system, wherein an internal geometry of the core is non-uniform.

A method of manufacturing a heat exchanger for a gas turbine engine according to another disclosed non-limiting embodiment of the present disclosure includes additively manufacturing a core of a heat exchanger to set a ratio of local surface area to flow area to control a pressure drop per unit length along the core.

A further embodiment of any of the foregoing embodiments of the present disclosure includes, wherein an external geometry and an internal geometry of the core are contoured with respect to a duct within which the core is located.

A further embodiment of any of the foregoing embodiments of the present disclosure includes, wherein the core, a frame around the core, and a mounting arrangement for the frame are additively manufactured of a single material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
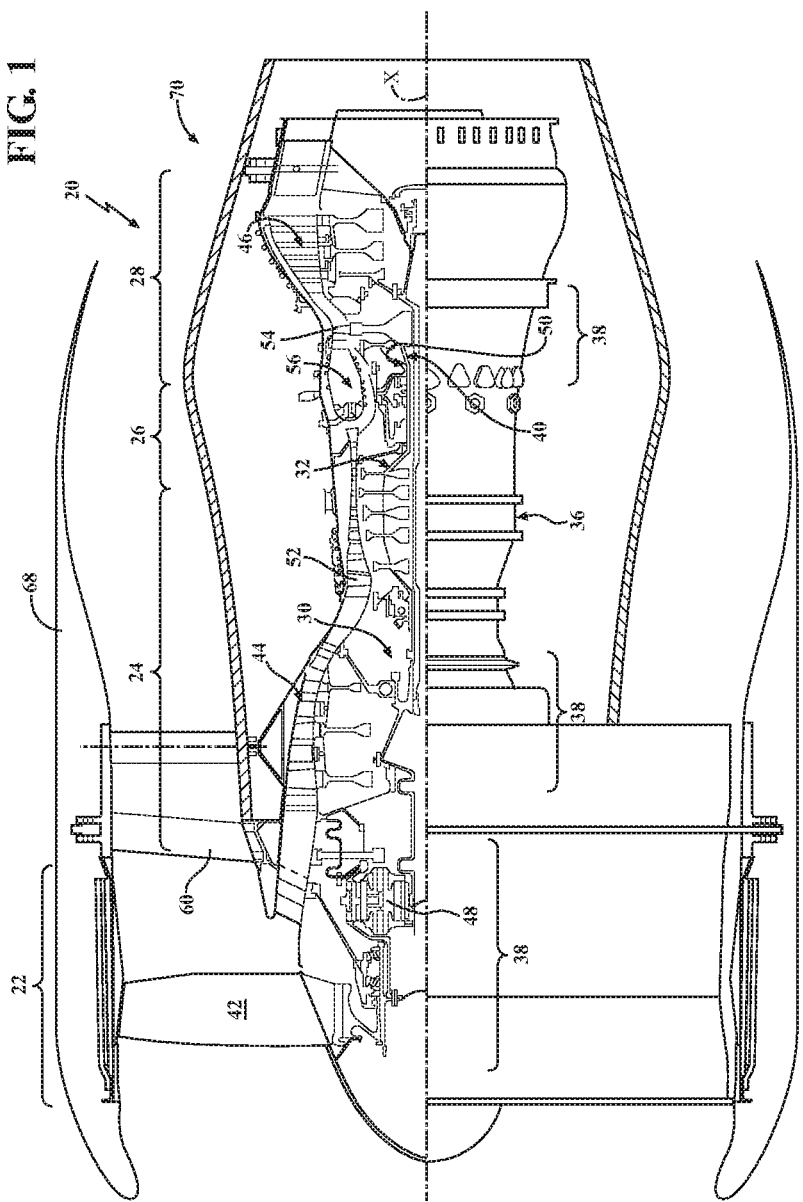
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis relative to an engine case structure 36. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric, and rotate about the engine central longitudinal axis.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the case structure 36.

In one non-limiting example, the gas turbine engine 20 is a high-bypass geared aircraft engine. With a bypass ratio greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only one example of a geared architecture engine and that the present disclosure is applicable to other gas turbine engines.

In one embodiment, a significant amount of thrust is provided by the bypass flow due to the high bypass ratio and the fan section 22 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting example is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
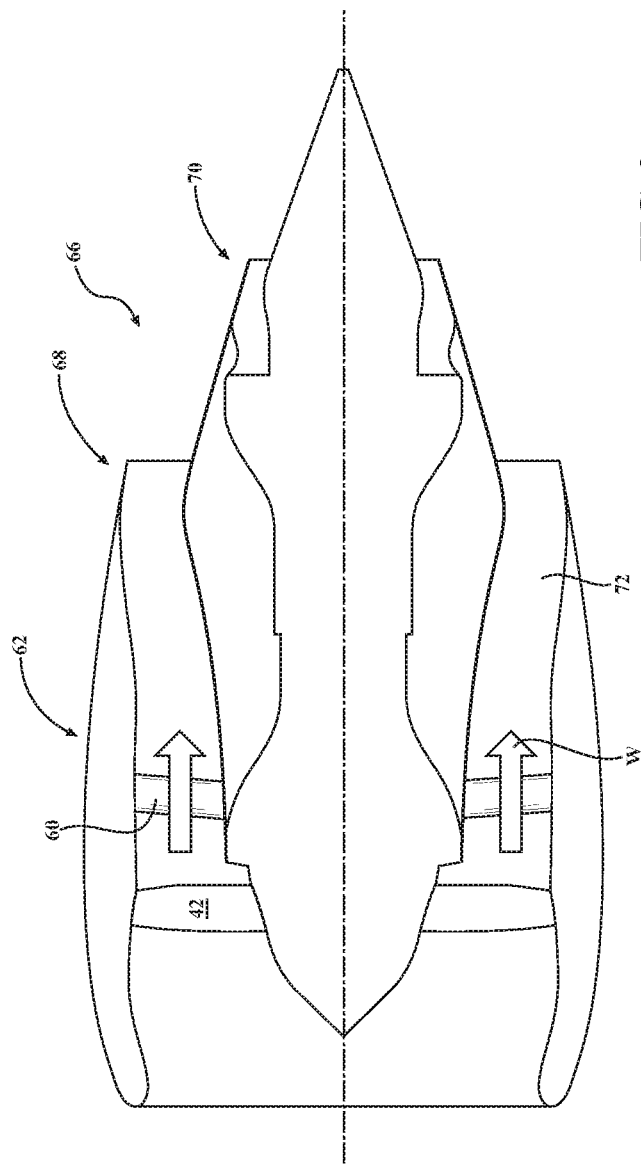
FIG. 2 is a schematic view of the example gas turbine engine of FIG. 1 with an example ducted heat exchanger system.

With reference to FIG. 2, the fan 42 drives air along a fan bypass flowpath W past a Fan Exit Guide Vane system 60. A ducted heat exchanger system 62 includes an additive manufactured heat exchanger 64 that may be at least partially integrated into a nacelle assembly 66 such as a fan nacelle 68, a core nacelle 70, a bifurcation 72, the Fan Exit Guide Vane system 60 or any combination thereof but still considered as in communication with the fan bypass flowpath W as defined herein. It should be appreciated that although a nacelle assembly 66 will be utilized in the illustrated embodiment, various other environments may also be used to contain the ducted heat exchanger system 62.

Figure 3:
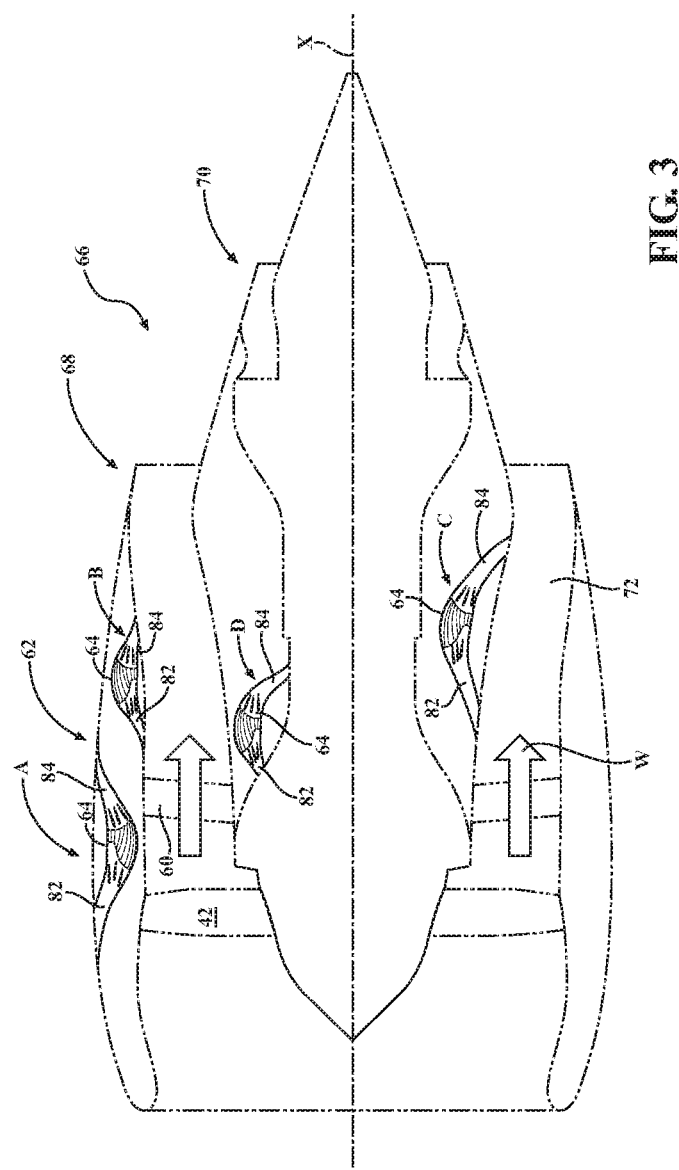
FIG. 3 is a schematic view of a nacelle assembly with a multiple of example locations for a ducted heat exchanger system that exchange flows with a common air stream.

With reference to FIG. 3, the additive manufactured heat exchanger 64 may locate an inlet 82 and an exit 84 in communication with the same air stream. For example, the inlet 82 and exit 84 may be located within the fan nacelle 68 for communication with a free stream airflow (illustrated schematically as position A); within the fan nacelle 68 for communication with a bypass stream stream airflow (illustrated schematically as position B); within the core nacelle 70 for communication with the bypass stream airflow (illustrated schematically as position C); and/or with the core engine (illustrated schematically as position D). It should be appreciated that various positions and flow paths may be alternatively, or additionally, provided.

Figure 4:
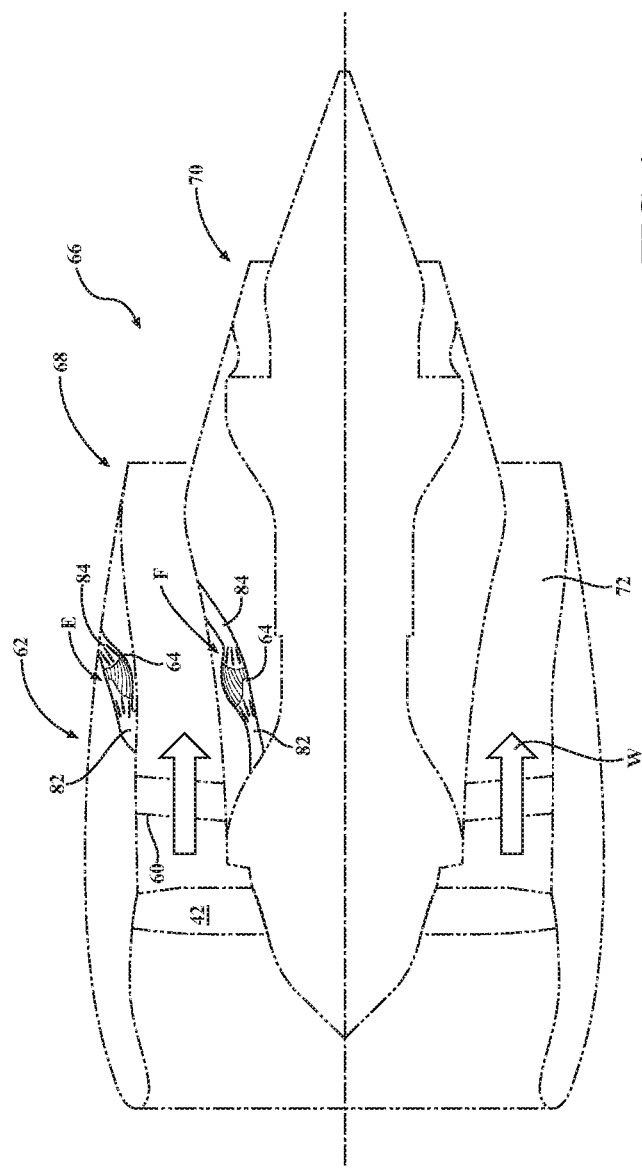
FIG. 4 is a schematic view of a nacelle assembly with a multiple of example locations for a ducted heat exchanger system that exchange flows with different air streams.

With reference to FIG. 4, the additive manufactured heat exchanger 64 may locate the inlet 82 and the exit 84 in communication with different air streams. For example, the additive manufactured heat exchanger 64 may be located within the fan nacelle 68 with the inlet 82 in communication with the bypass stream airflow W and the exit 84 in communication with the free stream airflow (illustrated schematically as position E). Alternatively, the additive manufactured heat exchanger 64 may be located within the core nacelle 70 with the inlet 82 in communication with the core engine such as the LPC 44 and the exit 84 in communication with the bypass stream airflow (illustrated schematically as position F). It should be appreciated that various positions and flow paths may be alternatively, or additionally, provided.

Figure 5:
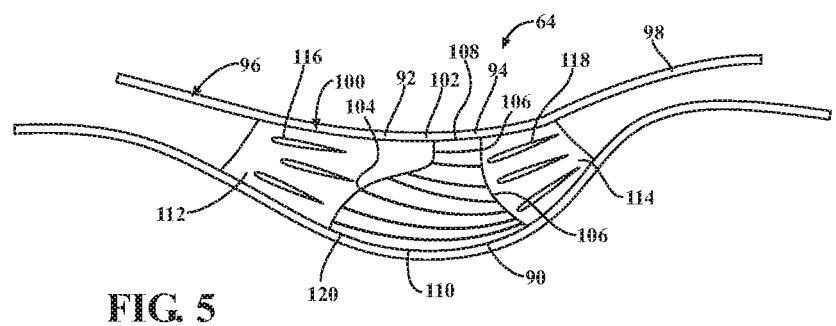
FIG. 5 a schematic view of a heat exchanger according to one disclosed non-limiting embodiment.

With reference to FIG. 5, the additive manufactured heat exchanger 64 in one disclosed non-limiting embodiment generally includes a core 90, a frame 92, a mount arrangement 94, an inlet fairing 96, and an exit fairing 98. It should be appreciated that although particular components and/or assemblies are separately defined such as the core 90, the frame 92, the mount arrangement 94, the inlet fairing 96, and the exit fairing 98 each, or any, may be otherwise combined or segregated within that referred to herein as the additive manufactured heat exchanger 64.

The core 90, the frame 92, the mount arrangement 94, the inlet fairing 96, and the exit fairing 98 may be individually or collectively manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF).

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of the relatively complex internal geometry to minimize assembly details and multi-component construction. The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 140 is then "grown" slice by slice, or layer by layer, until finished. Each layer has an example size between about 0.0005-0.001 inches (0.0127-0.0254 mm). Although particular additive manufacturing processes are disclosed, those skilled in the art of manufacturing will recognize that any other suitable rapid manufacturing methods using layer-by-layer construction or additive fabrication can alternatively be used.

Thermal fatigue is typically the primary life limiting aspect of heat exchanger. The low cycle fatigue of the additive manufactured heat exchanger 64 may be readily increased with a single material manufacturing method such as additive manufacturing. That is, additive manufacturing permits the manufacture of the core 90, the frame 92, the mount arrangement 94, the inlet fairing 96, and the exit fairing 98 out of the same material type as compared to conventional manufacturing techniques that require dissimilar materials based on the typical corrugated and brazed assembly techniques. Readily available optimization techniques can be developed to specify the surface features and geometries that provide the reduced thermal fatigue based on the heat transfer requirements. Single material construction via additive manufacturing offers the benefit of a single coefficient of thermal expansion while managing the thermal inertia of the heat transfer and structural surfaces.

With continued reference to FIG. 5, the core 90 is located within the frame 92 and mounted within a duct 100 by the mount arrangement 94 to position the core 90 between the inlet fairing 96 and the exit fairing 98. The core 90, as defined herein, may be considered a plate-fin, a shell-tube, or other air-air, or air-fluid passage internal geometry, while the frame 92 is the outer structure that supports these internal passage structures. The mount arrangement 94 may be formed, or at least partially formed, by the frame 92 to support the additive manufactured heat exchanger 64 with respect to the duct 100, the inlet fairing 96, and/or the exit fairing 98. It should be appreciated that the duct 100 may be at least partially formed by the inlet fairing 96 and/or the exit fairing 98 or be separate therefrom.

Figure 6:
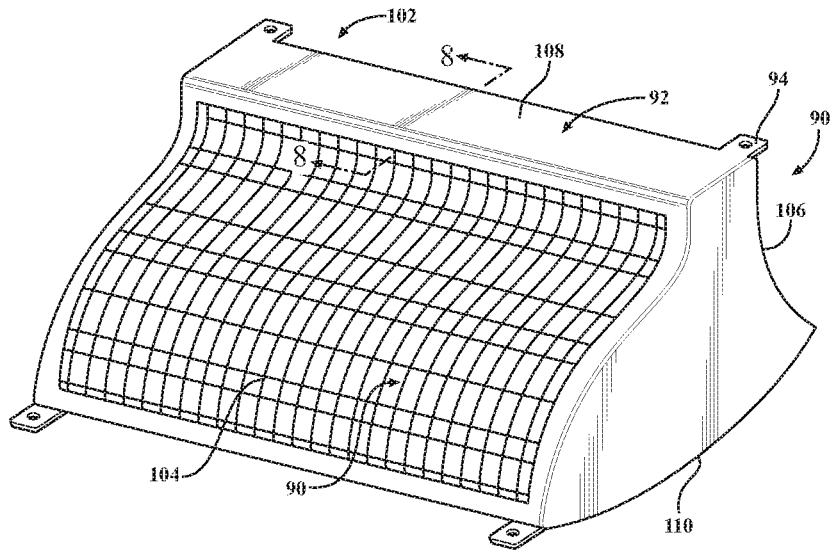
FIG. 6 is a perspective view of an example heat exchanger core according to one disclosed non-limiting embodiment.
Figure 7:
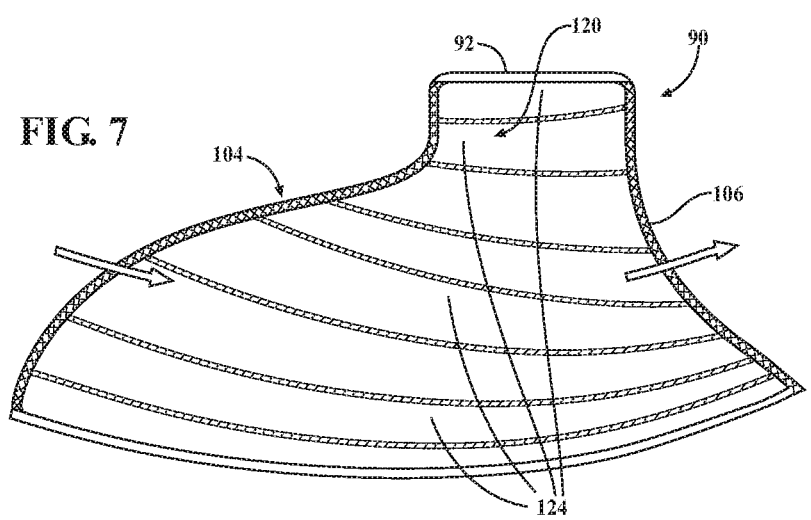
FIG. 7 is a cross-sectional view of the heat exchanger of FIG. 6.

Manufacture of the core 90, and/or frame 92, via additive manufacturing facilitates continuous variation in the geometry of, and within, the core 90 (best seen in FIGS. 6 and 7). The external geometry 102 of the frame 92 and the core 90 is thereby readily defined with respect to the shape and packaging space provided for the duct 100 and the airflow communicated there through. For example, a front face 104, a rear face 106, an upper surface 108, and a lower surface 110 of the core 90 need not be planar (best seen in FIGS. 6 and 7) as typical of a conventional "brick" shaped heat exchanger which is rectilinear with constant area "folded" flow passages, but may be contoured with respect to a non-uniform flow distribution of the airflow through the inlet fairing 96, the exit fairing 98, and/or the duct 100. It should be a further appreciated that the inlet fairing 96, the exit fairing 98, the core 90, and the duct 100 may also be arcuate to follow a contour of the aerodynamic lines of the fan nacelle 68, and/or core nacelle 70.

The contoured external geometry 102 (FIG. 6) of the core 90, may be determined via Computational Flow Dynamics (CFD) that may, for example, be utilized to set a ratio of local surface area to flow area to control the pressure drop per unit length of the core 90. The contoured external geometry 102 may also be defined such that the core 90 is generally perpendicular to the airflow that is to enter and exit the core 90 over the entirety of the front face 104 and the rear face 106. For example, the front face 104 and the rear face 106 may be contoured to be non-planar to match a diffusion area 112 in the inlet fairing 96 and the duct 100, as well as a contraction area 114 in the duct 100 and the exit fairing 98. Such a contoured external geometry 102 facilitates the equalization of the flow pressure to minimize pressure loss. In one example, the contoured external geometry 102 provides a reduction in a volume of the additively manufactured core 90 by about 15-20% as compared to an equivalent thermal capacity "brick" shaped heat exchanger.

With continued reference to FIG. 5, the additively manufactured core 90, and/or frame 92, may alternatively, or additionally, be extended into the diffusion area 112 in the inlet fairing 96 as well as the contraction area 114 in the exit fairing 98 to minimize flow misdistribution, e.g., the stream wise curvature of the heat exchanger may be additively manufactured to optimized for low flow loss. To further minimize flow misdistribution, a multiple of additively manufactured internal splitters 116, 118 may be located within the respective diffusion area 112 and/or contraction area 114. The internal splitters 116, 118, being additively manufactured, are readily shaped to minimize the flow distribution and facilitate the flow through the core 90.

To correspond with the contoured external geometry 102 of the core 90, an internal geometry 120 (FIG. 7) of the core 90 is also contoured to set a ratio of local surface area to flow area to control a pressure drop per unit length through the core 90. The individual internal passages, fin density, thickness, and type, can be varied throughout a flow path 122 defined by the core 90 via additive manufacturing of the core 90 to balance the flow and minimize pressure losses through the core 90.

The internal geometry 120 is contoured through additive manufacturing such that the flow path 120 through the core 90 may be non-uniform and may include non-uniform flow passages 124. That is, each flow passage 124 may vary in flow area with respect to a distance along the length of each flow passage 124 between the front face 104 and the rear face 106. For example, the flow area of a relatively smaller arc radius flow passage 124 may be of a different flow area than that of a relatively larger arc radius flow passage 124 such that the total flow area through the flow path 120 is balanced across the flow path 120 (FIG. 7).

The internal geometry 120 of the core 90 may also be tailored via additive manufacturing to balance stresses and tailor the additive manufactured heat exchanger 64 to accommodate, for example, maximum structural loads, or maximum thermal capabilities. That is, conventional approaches to heat exchanger manufacturing may have a relatively limited variation potential on the flow passages and structural features due to the tooling cost and capability to fold the uniform heat exchange surfaces, then efficiently braze the surfaces together.

The additive manufacturing process facilitates an approach that can uniquely tailor the geometry based on the heat transfer requirements to balance stress levels throughout, and thereby optimize the life capability of the material chosen for the unit. For example, fin density, thickness, and type can be varied throughout to balance the stress with respect the thermal loads. For maximum structural loads, the internal geometry 120 may include, for example, box, honeycomb, triangular, or other load bearing type structures, while for maximum thermal capabilities, the internal geometry 120 may include, for example, thin surfaces that provide significant surface area. The focused approach provided by additive manufacturing which changes the geometry locally, versus globally, will reduce over-design which can increase cost and weight.

Figure 8:
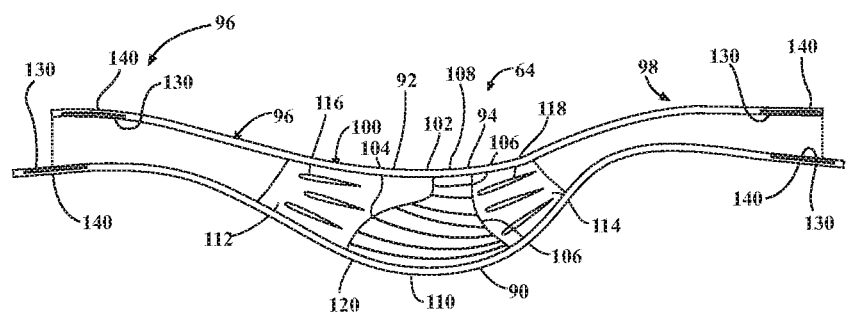
FIG. 8 is a schematic view of a ducted heat exchanger system according to another disclosed non-limiting embodiment.

With reference to FIG. 8, the inlet fairing 96, and the exit fairing 98, may be additively manufactured in accords with an optimized design integration process such as Computational Fluid Dynamic models to provide ideal, low-loss aerodynamic fairings that can decrease the overall size and weight of the ducted heat exchanger system 62.

In another disclosed non-limiting embodiment, the inlet fairing 96 and/or the exit fairing 98 may be additively manufactured, in whole or in part, of a material that facilities heat transfer from the core 90. The inlet fairing 96 and the exit fairing 98 provide significant surface areas to facilitate this heat transfer and thereby operates as an effective heat sink to further increase the surface area of the heat exchanger 64, irrespective of whether the heat exchanger core 90 is additively manufactured or conventionally manufactured. Combined with contoured additive manufacturing techniques, ideal nacelle aerodynamic lines can be realized without compromises due to current manufacturing limitations.

Figure 9:
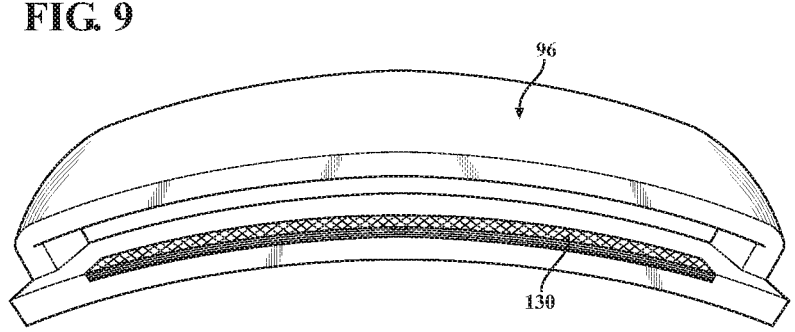
FIG. 9 is a perspective view of a fairing for the ducted heat exchanger system.

In one disclosed non-limiting embodiment, at least one surface 130 of the inlet fairing 96 and/or the exit fairing 98 (also shown in FIG. 9) may be additively manufactured to be an extension of the core 90, the frame 92, and/or the mount arrangement 94 to facilitate heat transfer from the core 90. The surface 130 is contoured to follow the aerodynamic lines of the inlet fairing 96 and/or the exit fairing 98 to efficiently communicate airflow along the duct 100 but may be manufactured of a material different than that of the remainder of the inlet fairing 96 and/or the exit fairing 98. Alternatively, the inlet fairing 96 and/or the exit fairing 98 are additively manufactured entirely of a material that facilitates such heat transfer. That is, the inlet fairing 96 and/or the exit fairing 98 may be manufactured in whole, or in part, of a material different than that of the nacelle assembly 66.

In another disclosed non-limiting embodiment, the at least one surface 130 is a surface of a heat exchanger core 140 such as an additively manufactured plate type heat exchanger of multiple, thin, slightly separated plates that have relatively large surface areas and fluid flow passages for heat transfer. That is, the heat exchanger core 140 is additively manufactured such that the surface 130 is contoured to follow the aerodynamic lines of the inlet fairing 96 and/or the exit fairing 98. It should be appreciated that the least one surface 130 may include chevrons, dimples, or other patterns to facilitate heat transfer as well as airflow control.

Reduced pressure losses allow the overall ducted heat exchanger system 62 size to be decreased to facilitate, for example, ideal nacelle aero curves. Cost reductions may also be realized due to the reduced system size.

The use of the terms "a," "an," "the," and similar references in the context of description (especially in the context of the following claims) are to be construed to cover both the singular and the plural, unless otherwise indicated herein or specifically contradicted by context. The modifier "about"

used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of manufacturing a heat exchanger for location within a duct in a nacelle for a gas turbine engine, an inlet to the nacelle and an exit from the nacelle for communication of an airflow through the duct comprising:
    additively manufacturing an external geometry of a core of the heat exchanger to fit within the duct;
    additively manufacturing an internal geometry of the additive manufactured heat exchanger core such that at least one of a multiple of flow passages is varied with respect to a distance along the length of the at least one of the multiple of flow passages;
    additively manufacturing a front face of the core transverse to the duct and contoured with respect to a non-uniform flow distribution of the airflow that enters the core perpendicular to the front face over the entirety of the front face; and
    additively manufacturing a rear face of the core transverse to the duct and contoured with respect to the non-uniform flow distribution of the airflow that exits the core perpendicular to said rear face over the entirety of said rear face, the rear face of said core downstream of the front face within the duct along an entire central longitudinal axis and wherein a width of the core measured along the central longitudinal axis from the front face to the rear face is varied along a radial direction.

2. The method as recited in claim 1, wherein the external geometry and the internal geometry of the core are contoured with respect to a duct within which said core is located.

3. The method as recited in claim 1, wherein the core, a frame around the core, and a mounting arrangement for the frame are additively manufactured of a single material.

4. The method as recited in claim 1, wherein additively manufacturing the core of the heat exchanger includes setting a ratio of local surface area to flow area to control the pressure drop per unit length along the additive manufactured heat exchanger core.

5. The method as recited in claim 1, further comprising installing the heat exchanger in the duct.

6. The method as recited in claim 1, wherein the duct for which the heat exchanger is manufactured has a known contour and known airflow, and wherein the additive manufacturing of the internal geometry is set to equalize flow pressure and minimize pressure loss with respect to the known contour and the known airflow.

7. The method as recited in claim 6, wherein the additive manufacturing of the internal geometry is set using Computational Flow Dynamics (CFD) to equalize the flow pressure and minimize the pressure loss.

8. The method as recited in claim 1, wherein the duct for which the heat exchanger is manufactured has a known contour and known airflow having a known non-uniform flow distribution, and wherein the additively manufacturing of the front face and the additively manufacturing of the rear face are conducted with respect to the known non-uniform flow distribution.

* * * * *